United States Patent
Stern et al.

[15] 3,705,387
[45] Dec. 5, 1972

[54] REMOTE CONTROL SYSTEM FOR ELECTRO-MECHANICAL VEHICLE

[72] Inventors: Kenneth Stern; Karen Stern, both of Detroit, Mich.; Robert Spoon, Hanson, Mich.

[73] Assignees: Kenneth Stern; Robert Spoon; Thomas J. Grossman, Birmingham, Mich.; part interest to each

[22] Filed: Jan. 11, 1971

[21] Appl. No.: 105,333

[52] U.S. Cl.............340/171 A, 318/581, 325/37, 273/86, 191/54, 180/98, 46/243 R, 46/244 A, 340/171 A
[51] Int. Cl......A63h 30/04, H04b 7/00, H04a 11/02
[58] Field of Search.............318/581; 180/98, 2, 16; 46/243 E, 243 P, 243 S, 243 R, 243 LV, 244 A, 244 B, 244 R; 343/225; 191/13.5; 273/86; 325/37; 179/82; 340/171 A

[56] References Cited

UNITED STATES PATENTS

| | | |
|---|---|---|
| 3,587,100 | 6/1971 | Doremus.............................343/225 |
| 3,601,400 | 8/1971 | Boles.................................273/86 B |
| 1,652,840 | 12/1927 | Stoehrer..............................180/2 |
| 2,567,431 | 9/1951 | Halsteau..............................179/82 |

Primary Examiner—John W. Caldwell
Assistant Examiner—William M. Wannisky
Attorney—Cullen, Settle, Sloman & Cantor

[57] ABSTRACT

A remote electronically controlled vehicle which is movable between two conductive tracks; the vehicle is equipped with electrical control devices for steering and driving of the vehicle, which are connected by contacts to the conducting track surfaces; the conducting track is equipped to handle a plurality of these vehicles through a single electronic control unit having a multiple channel FM telemetry circuit including an oscillator and mixer circuit; multiple individual manual controls corresponding to the number of vehicles on the conductive tracks can be attached to the control unit for individual independent control of the vehicles on the conductive tracks.

3 Claims, 7 Drawing Figures

PATENTED DEC 5 1972

INVENTORS
KENNETH STERN
KAREN STERN
ROBERT SPOON

BY Cullen, Settle, Sloman & Cantor

ATTORNEYS 3,705,387

REMOTE CONTROL SYSTEM FOR ELECTRO-MECHANICAL VEHICLE

BACKGROUND AND SUMMARY OF THE INVENTION

The present invention relates in general to remote controlled vehicles and an associated track structure and relates more in particular to speed and direction controlable vehicles, adapted for movement between electrically conducting surfaces with which the vehicle is in contact, by remote electronic control.

Although the present invention is of particular utility for toy vehicles supported on tracks, the present invention is by no means limited thereto as will become evident.

Amusement devices employing scale model race tracks and associated electro-mechanically controlled vehicles on a model scale have become very popular in recent times.

One form of these devices consists of a defined track having a number of parallel slots therein by which the vehicles are guided along the track. Electrical connections are provided between the vehicles and the track so that, when electrical power is supplied, the vehicles are moved around the track. This arrangement has the disadvantage in that the vehicles are not steerable, that is, they cannot move across the track from the left to the right and vice-versa, but are confined to their particular slot.

In another form of the known devices, an upper and lower conducting surface is provided. The vehicles ride on the lower conducting surface and are provided with a contact or trolley which makes contact with the upper conducting surface. Thus, when electrical energy is supplied the vehicles move along the lower conducting surface.

The present invention is concerned with the latter arrangement.

The primary object of this invention is the provision of remote controlled vehicles in combination with an electrically conductive track surface upon which the vehicles move; the vehicles being independently controlable as to speed and direction of movement by means of a multi-channel FM telemetry electronic network.

Another object of the present invention is the provision of a track construction by means of a module or building block concept to provide a variety of track configurations.

Generally, the present invention provides a track which consists of a series of interconnecting channel sections having electrically conductive surfaces which are attached to vertical insulated supports to provide parallel horizontal plane surfaces, the lower plane surface being the track which supports a remotely controlled vehicle. The interconnecting channel sections of the track of the present invention have means for attachment to each other similar to those of toy electric train tracks to provide electrical continuity. The individual track sections may be of various configurations so as to provide a practically infinite variety of track constructions.

Basically, the remotely controlled vehicle of the present invention—which may have any desired shape, such as a go-cart, sports car, race car, boat, airplane, etc.— has electro-mechanical control means incorporated therein adapted to control the direction of movement and speed of the vehicle. The track is conductively connected to a source of DC current and to a multiple channel FM telemetry circuit. Each car on the track is programmed so as to be responsive to particular control signals transmitted through the telemetry network by means of individual manual control units corresponding in number to the number of vehicles on the track.

Thus, each vehicle on the track can be independently steered and speed controlled by means externally of the track, thereby providing a highly improved racing game device simulating actual race track conditions by the ability of the vehicles to be independently controlled, so that the vehicles can move across the track from left to right or vice-versa. Thus, the present improved device, demands a certain amount of skill on the part of the operators of the individual vehicles to drive the vehicles along the path of the track at the highest speed without overturning or running into another vehicle on the track.

The purpose of the game track of the present invention is a game in which the skill of the vehicle operator is required to coordinate the vehicle speed and the direction of movement of the vehicle with respect to other vehicles on the track to avoid accidents or overturning so that, in the end, the winning of the race, by means of the present improved electronic control mechanism, is almost entirely a matter of superior skill on the part of the operator controlling the winning vehicle.

The present invention will be more fully understood by reference to the following detailed description of a preferred embodiment. BRIEF DESCRIPTION OF THE DRAWINGS The accompanying drawings illustrate more or less schematically a preferred form of the invention in which.

DESCRIPTION OF THE INVENTION

Figure 1:
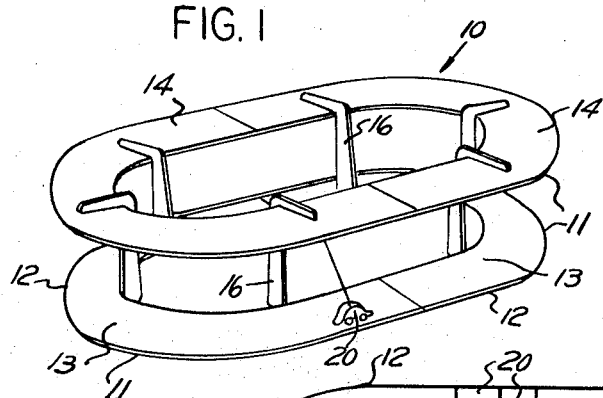
FIG. 1 is a perspective illustration of the present improved track construction shown in simple oval shape for illustrating purpose and showing a vehicle positioned thereon.
Figure 1A:
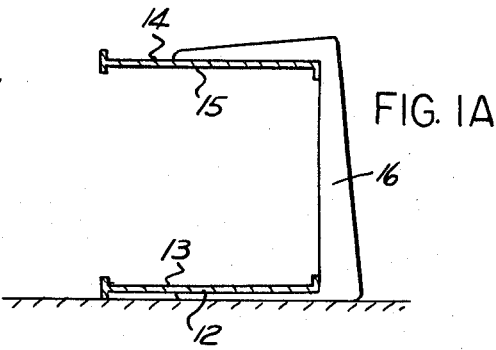
FIG. 1a is an enlarged cross-section through one track secton of FIG. 1 which is representative of all of the track sections.
Figure 2:
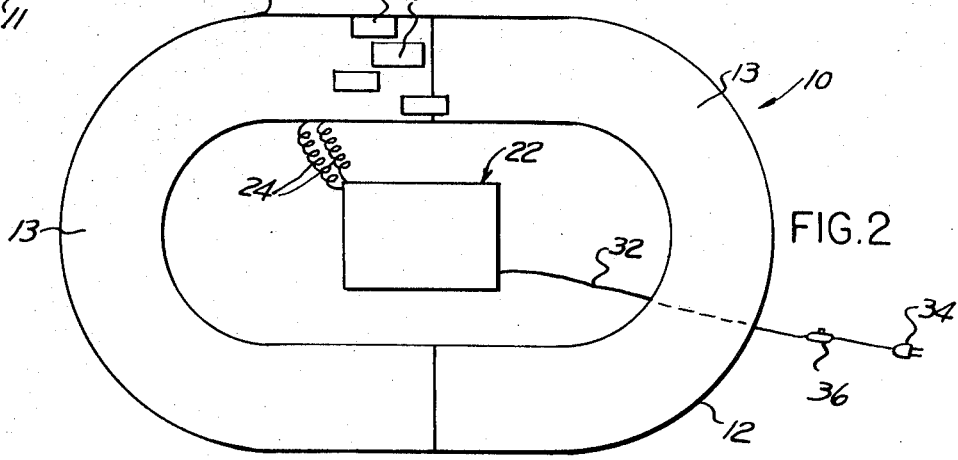
FIG. 2 is a schematic plan view of the lower track surface of the track construction shown in FIG. 1 schematically illustrating the electronic control mechanism.

With reference to FIGS. 1 and 2, the present device comprises a track structure generally indicated by the numeral 10 which is put together by means of individual track sections 11 which are connected to each other in conventional toy train track fashion. It will be understood that the individual track sections 11 may be of any shape and configuration. The track sections in this instance, to simplify the description, are being shown as to comprise two paralleling linear track sections connected at opposite ends to curvilinear track sections to form an oval shape track structure. The track sections are preferably made of a non-conducting material, such as plastic. As seen in FIG. 1a, each track section is composed of lower track 12 and a parallel upper track 14 vertically spaced by support columns 16 to which the tracks are secured. The columns 16 are likewise made of non-conductive material. Each of the lower and upper tracks 12 and 14 is provided with an electrically conductive surface 13 and 15, respectively, such as metal coating.

Figure 3:
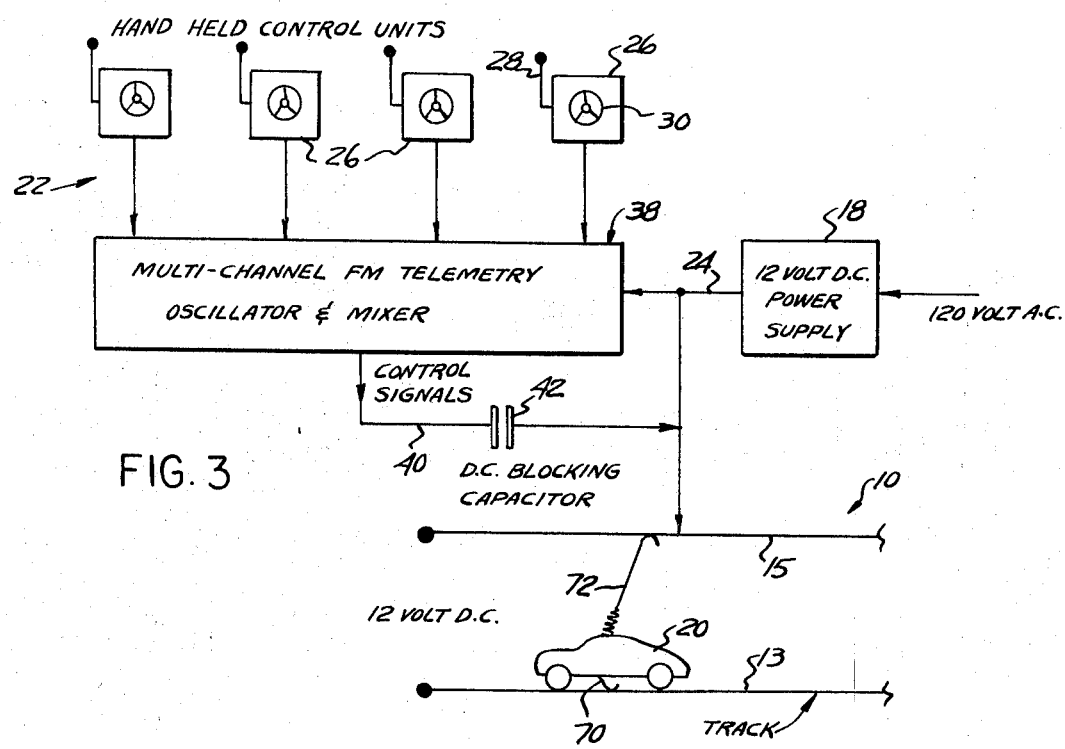
FIG. 3 is a box diagram of the electronic control unit for the track shown in FIG. 2.

With additional reference to FIG. 3, the conductive surface 13 of the lower track 12 is grounded and is connected to the minus pole of a 12 volt DC power supply 18 and the conductive surface 15 of the upper track is connected to the plus pole of the power supply 18. The 12 volt DC power supply 18, as is known, includes the usual transformer (not shown) for connection to the regular 120 volt AC current.

As shown in FIG. 2, the lower track 12 is adapted to support a plurality of vehicles 20, of any type, for movement therealong.

Inside of the track 10, as schematically shown in FIG. 2, an electronic control unit 22 is provided which is connected through conduits 24 with the conductive surfaces 13 and 15 and the 12 volt DC power supply 18. The electronic control unit 22 is adapted to accomodate a plurality of manual control units 26 (only one of which is shown in FIG. 2) including an on-off switch 28 and directional control 30, which may be in the form of a steering wheel. The electronic control unit 22 is further connected by means of conduit 32 to the 120 volt AC power supply, indicated by means of a plug 34 for connection to the outlet of the power supply. The conduit 32 includes a main power on-off control switch 36 to selectively supply electrical energy to the 12 volt DC power supply 18 and electronic control unit 22. Conveniently, the control unit 22 may be housed in a scale model building of any kind, to further impress a simulated track structure.

With particular reference to FIG. 3, the electronic control unit 22 includes a multi-channel FM telemetry network of any conventional design 38, which may include an oscillator and a mixer. The telemetry network 38 is adapted to change the 120 volt AC energy input to respective control signals in response to individual operation of the control units 26 through conduit 40 to the track 10. Conduit 40 includes a DC blocking capacitor 42 to prevent feed back of DC current from the track into the telemetry network. It will be understood that the control signals emited from the telemetry network 38 are of selective frequencies tuned to the respective vehicles on the track as will be more fully understood hereafter.

Figure 5:
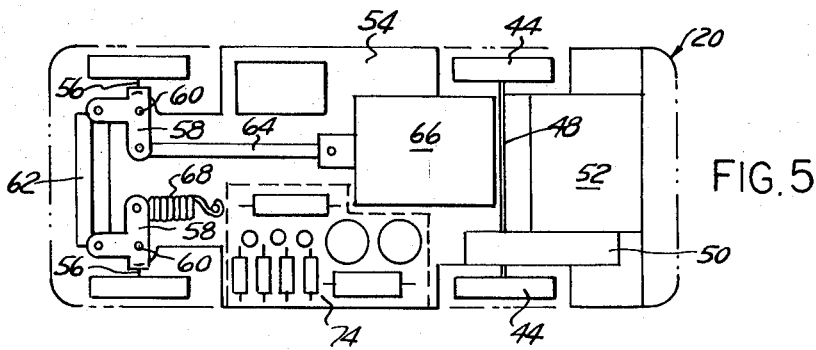
FIG. 5 is a bottom plan view of the vehicle shown in FIG. 4 illustrating the electronic and electro-mechanical control mechanism of the vehicle.
Figure 4:
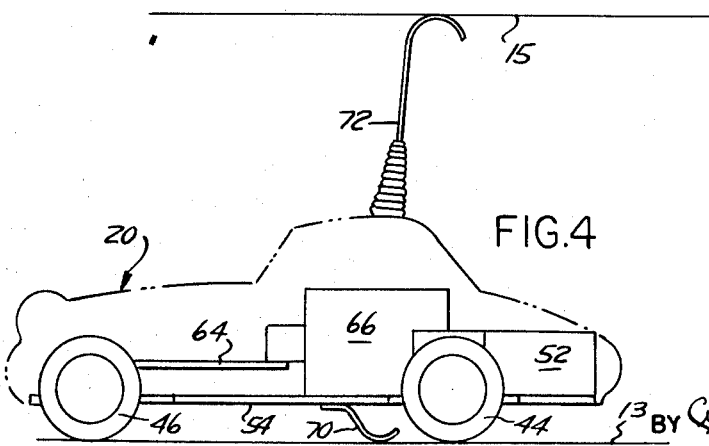
FIG. 4 is an enlarged side view of a vehicle which may be used on the track of FIG. 1.

With additional reference to FIG. 4 and 5, in this instance with regard to FIG. 4, the vehicle 20 shown is a scale model car although it could have any other desired body shape. The vehicle 20 is equipped with a pair of drive wheels 44 to propel the vehicle along the lower track 12 and a pair of steerable front wheels 46.

The pair of driving wheels 44 are connected to a drive axle 48 which is driven by means of a gear mechanism 50 of any known construction. The gear mechanism 50 is drivingly connected to a DC motor 52 attached to the chassis 54 of the vehicle.

Each of the front wheels 46 is rotatably supported on an axle 56 each of which is secured to one end of a bell crank lever 58 each pivoted at 60 to the chassis 54. The opposite bell crank levers 58 are interconnected to each other by means of a push-pull link 62 for rotational movement of the bell crank levers in the same direction. One of the bell crank levers 58 is further pivotally connected to the actuating rod 64 of a solenoid 66 supported on the chassis 54. The other end of the actuating rod 64 is connected to the other end of the bell crank 58 so that upon energization of the solenoid 66 the front wheels 46 will be turned in the desired direction.

The inner end of the opposite bell crank lever 58 of the other front wheel 46 is connected to an energy storing bias member such as a tension spring 68 which at the other end is attached to the chassis 54.

Thus, normally the tension spring 68 tends to return the bell crank lever 58 to its normal position, as shown in FIG. 5, in which the front wheels 46 are aligned in straight forward travel.

In the position of the vehicle as illustrated in FIG. 5, the solenoid 66 is inactive. Upon actuation of a respective steering control 30 (FIG. 3) of any of the manual control units 26, actuating rod 64 will be drawn into the coil of the solenoid 66, thereby pivoting to bell crank lever 58, to which the actuating rod 64 is attached, in a counter-clockwise direction. This movement is transferred by means of the push-pull link 62 to the other bell crank 58 for similar movement in counter-clockwise direction against the force of the tension spring 68. Thus, the front wheels 46 are turned in the same direction, causing a left turn movement of the vehicle 28 from the straight forward position in FIG. 5. Upon deactivation of the solenoid 66 by turning the control knob 30 of the respective control unit 26 (FIG. 3) to "neutral" the loaded tension spring 68 functions to reversely turn the bell crank 68, to which the tension spring is attached, to the normal position of fIG. 5. This movement of course is similarly transferred to the opposite bell crank 58 moving the actuating rod 64 outwardly of the solenoid 66 into the position shown in FIG. 5. As long as the control unit 26 is moved from the neutral position in any direction, clockwise or counter-clockwise, and retained in that position and depending on its degree of movement, the vehicle will continue to move in the respective direction. Thus, in the case of a circular track, the solenoid 66 may always be energized by means of the directional position of the control knob 30 to move the vehicle 20 around the circular track in left hand or right hand turn direction. The solenoid 66, as will be explained further on, is electronically connected to the FM telemetry network to be responsive to certain signals received therefrom by actuation of the manual control unit 26.

The electric driving motor 52 and solenoid 66 of the vehicle 20 are suitably connected by conduits (not shown) to a first wiper contact arm 70 attached to the bottom of the chassis to resiliently contact the conducting surface 13 of the lower track 12 along which the vehicle 20 travels. The motor 52 and solenoid 66 are additionally electrically connected by suitable conduits (not shown) to a second wiper contact 72 attached to the body of the vehicle. The second wiper contact arm 72 is in the form of a resiliently supported trolley, similar to those employed on an electric street car, and extends upwardly from the vehicle 20 for wiping contact against the upper conductive surface 15 of the upper parallel track 14.

Thus, when electrical energy is applied to the upper and lower contacting surfaces 13 and 15 respectively, by means of the 12 volt DC power supply 18, the electrical motor 52 will be energized, when the on-off switch 28 is manipulated to drive the gear transmission 50 which in turn rotates the driving wheels 44 to thereby move the vehicle 20 along the lower track 12 at a selected speed.

Figure 6:
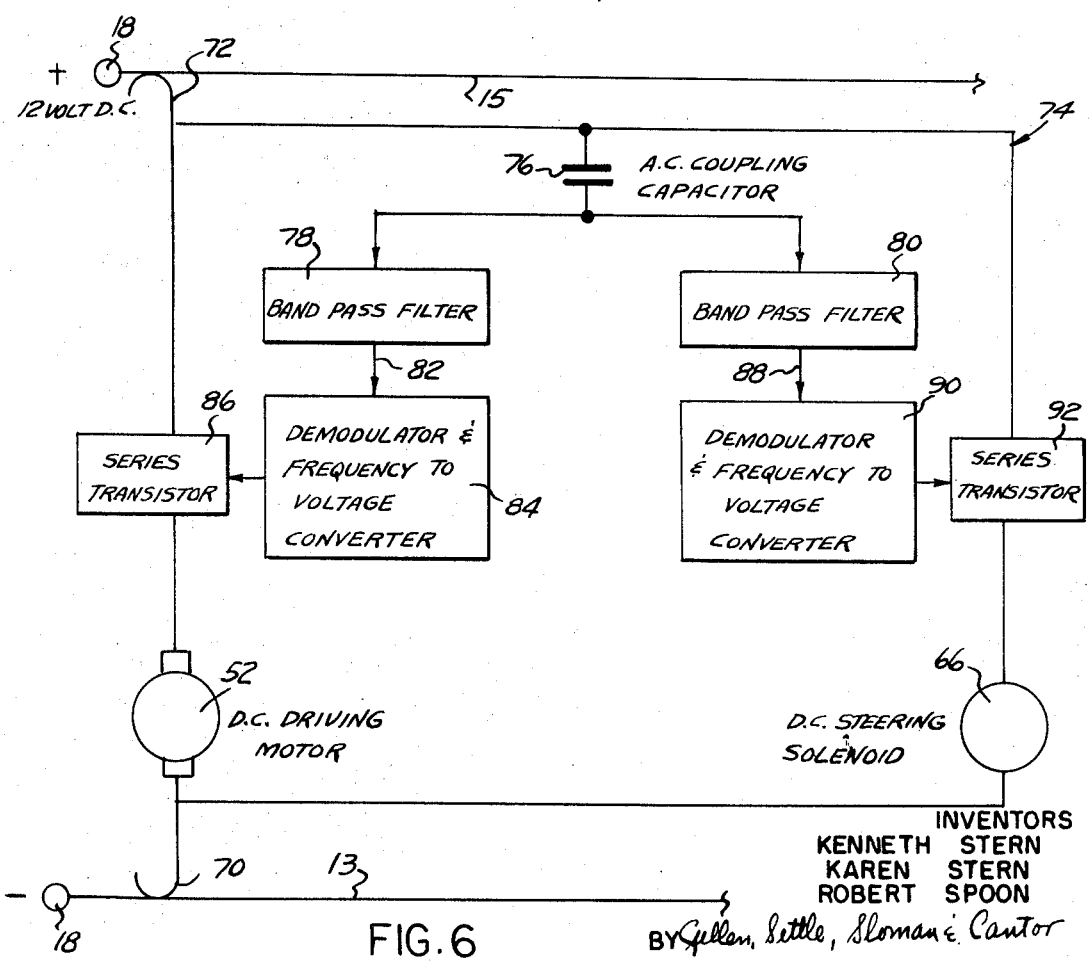
FIG. 6 is another box diagram of the electronic control mechanism of the vehicle shown in FIGS. 4 and 5.

With further particular reference to FIG. 6, the chassis 54 of the vehicle 20 supports a printed circuit board 74, comprising conventional electronic components such as transistors and rectifiers and the like in a manner normally known in the art. The printed circuit board 74 is electrically connected to the multiple channel FM telemetry network 38 through conduit 40 and DC blocking capacitor 42 (FIG. 3) to be responsive to signals received from the network 38. The printed circuit board 74 is also further connected to the solenoid 66 and electric driving motor 52 for electronic control of these devices in response to manipulation of a respective manual control unit 26.

The printed circuit board 74, for example, includes and AC coupling capacitor 76 which is electrically connected to a pair of band pass filters 78 and 80. Both of the band pass filters 78 and 80 are adapted and selected for any individual vehicle or for a plurality of vehicles operating on the same track 10, to be responsive to certain frequency control signals received from the electronic telemetry network 38 in response to manipulation of a corresponding manual control unit 26 externally and remote from the track 10.

The band pass filter 78 is connected by conduit 82 to a demodulator and frequency to voltage converter unit 84 which in turn is connected to a transistor 86 connected in series to the driving motor 52 of the vehicle between the upper conductor 15 and the lower conductor surface 13.

Similarly, the opposite band pass filter 80 included in the vehicle electronic circuit 74, is connected by conduit 88 to a similar demodulator and frequency to voltage converter unit 90 which in turn is connected to series transistor 92. Series transistor 92 is connected in series to the steering solenoid 66 between the upper conducting surface 15 and lower conducting surface 13 as shown.

In operation, a number of vehicles 20 may be deployed on the lower track 12 of the track structure 10, as shown in FIG. 2. Each of the vehicles 20 is constructed identically as shown and described in connection with FIG. 4 to 6.

The multi-channel FM telemetry network 38 has a plurality of manual control units 26 corresponding to the number of vehicles on the track 12, and which are preferably positioned at a remote location from the track structure 10 as will be understood.

After placing the main on-off switch 36 (FIG. 2) in the "on" position the 120 Volt AC current normally available, will be introduced into the electronic control unit 22 to (1) energize the multi-channel FM telemetry network 38 and (2) to be transformed into a 12 Volt DC power supply by means of a suitable transformer and rectifier unit (not shown) for operational movement of the vehicles 20 disposed on the track 12.

As mentioned before, the multi-channel FM telemetry network 38 is powered by conventional 120 Volt AC current for creation of signals at certain frequencies to be transmitted to the printed circuit board 74 of the vehicle 20 for translation into 12 Volt DC signals to thereby remotely electronically control the direction of movement and speed of the vehicles 20 along the track 12.

Each of the band pass filters 78–80 in each of the vehicles 20 is turned to a different frequency to be independently responsive to its associated manual control unit 26. Thus, the multiplex control signals emitted from the FM network 38 to the track 10 by manipulation of the manual control units 26, will be received by their associated vehicle on the track 12 which filters out all other frequencies not within the range on which the respective electronic circuit 74 is programmed. Of course, it will happen frequently, or almost continuously, that all of the manual control units 26 will be operated simultaneously during commencement of a race causing the multi-channel FM telemetry network to continuously feed signals at varying frequencies to the track 10 which are received by the vehicles on the track. However, each vehicle on the track is responsive only to a certain frequency to which it is programmed for operation by its associated manual control unit 26.

Thus, the present invention provides individual speed and directional control of the vehicle on the track by electronic means to more naturally simulate actual race track conditions for independent operation of the vehicles on the track requiring a certain skill on the part of the operator of any of the vehicles to win the race.

It will be evident from the foregoing description and accompanying drawings that each of the vehicles 20 is independently movable to traverse the track in such fashion that a vehicle 20 starting out from the outside of the track is capable of being moved to the inside of the track, which of course, requires less time to travel around the track.

Depending on the skill of the operator of each of the vehicles 20, overturning or collision among the vehicles 20 on the track must, of course, be avoided, thus adding to the skill necessary to efficiently operate the present novel device in such manner as to win the race.

The present novel device therefore, by not only being a toy game, provides a highly sophisticated educational tool to sharpen the response of the persons operating the vehicles on the track.

Although the present invention has been described as a game device incorporating a scale model race track of any desired configuration and remotely electronically controlled vehicles, the present improved system, of course, could be employed in commercial or passenger transportation systems as well.

It is within the scope of the present invention that the lower track 12 could be shaped in the form of a trough and being made fluid tight and filled with water to support scale model boats, ships and any other water conveyances in a realistic fashion and being controlled individually in the same manner as described herein in connection with a land vehicle.

Similarly, the present improved system is not limited to track confined activity but may be expanded beyond the track or without any track at all, incorporating simultaneous remote control of a plurality of conveyances of any type and for any purpose in accordance with the present electronic remote control system.

The present invention may be embodied in certain other forms without departing from the spirit and essential characteristic thereof, therefore, the present embodiment is to be considered in all respects as illustrative only and not restrictive, the scope of the invention being indicated by the appended claims rather than by the foregoing description.

We claim:

1. A remote electronic control mechanism for a vehicle adapted to move along a path defined by spaced conductors; said control mechanism comprising a source of DC current connected to said conductors; said vehicle having contact means for abutment against said conductors to thereby provide electrical communication between said vehicle and said source of DC current; a source of AC current; a multi-channel FM telemetry network connected to said AC current and to said conductors; at least one manual control unit connected to said FM telemetry network for control of said vehicle; said vehicle having a driving motor electrically connected through said contact means to said conductors and electro-magnetic steering means similarly electrically connected through said contacts to said conductors; said vehicle further having a printed circuit board electrically connected to said FM telemetry network via said contacts and said conductors; said printed circuit board including a first band pass filter tuned to a predetermined frequency and connected by an AC coupling capacitor to said conductors; a first demodulator and frequency to voltage converter connected to said first band pass filter, and a first transistor connected in series between said frequency to voltage converter and said electro-magnetic steering means; a second band pass filter turned to another predetermined frequency and connected via said AC coupling capacitor to said conductors; a second demodulator and frequency to voltage converter connected to said second band pass filter, and a second transistor connected in series between said second frequency to voltage converter and said driving motor or said vehicle; said control unit having manual means to individually control said electro-magnetic steering means and said driving motor of said vehicle; said multi-channel FM telemetry network being adapted to emit signals at a certain frequency in response to manipulation of said control unit; said signals being fed via said AC coupling capacitor to said first and second band pass filters; said first and second demodulators and frequency to voltage converters and via said first and second transistors to said electro-magnetic steering means and to the driving motor in response to the frequency of said signals corresponding to the tuned frequency of said first or second band pass filters.

2. The electronic control mechanism as defined in claim 1 further comprising a DC blocking means between said conductors and said FM telemetry network.

3. In the electronic control mechanism as defined in claim 1, the further provision of at least a plurality of vehicles adapted to be controlled by said FM telemetry network and a plurality of manual control units corresponding in number to the number of said vehicles; said printed circuit board of each of said vehicle being tuned to different frequencies to thereby individually control said vehicles independently of each other upon manipulation of either or all of said control units.

* * * * *